United States Patent
Singh et al.

(10) Patent No.: US 6,393,551 B1
(45) Date of Patent: May 21, 2002

(54) REDUCING INSTRUCTION TRANSACTIONS IN A MICROPROCESSOR

(75) Inventors: Balraj Singh, Morgan Hill; Eric Chesters, Mountain View; Venkat Mattela, San Jose; Rod G. Fleck, Mountain View, all of CA (US)

(73) Assignee: Infineon Technologies North America Corp., San Jose, CA (US)

(*) Notice: Subject to any disclaimer, the term of this patent is extended or adjusted under 35 U.S.C. 154(b) by 0 days.

(21) Appl. No.: 09/320,827

(22) Filed: May 26, 1999

(51) Int. Cl.[7] .............................................. G06F 15/16
(52) U.S. Cl. ........................ 712/214; 712/213; 712/241
(58) Field of Search ................................. 712/205, 206, 712/213, 214, 215, 241

(56) References Cited

U.S. PATENT DOCUMENTS

| | | |
|---|---|---|
| 4,933,837 A | 6/1990 | Freidin |
| 5,251,308 A * | 10/1993 | Frank et al. ................ 711/163 |
| 5,590,308 A * | 12/1996 | Shih ........................... 711/136 |
| 5,613,080 A | 3/1997 | Ray et al. |
| 5,696,985 A * | 12/1997 | Crump et al. .................. 712/36 |
| 5,860,101 A * | 1/1999 | Armilli et al. ............... 711/121 |
| 5,898,852 A | 4/1999 | Holdbrook et al. |
| 6,029,240 A * | 2/2000 | Blanner et al. ................ 712/23 |
| 6,085,315 A * | 7/2000 | Fleck et al. .................. 712/241 |

FOREIGN PATENT DOCUMENTS

EP                 0 747 834 A       12/1996

* cited by examiner

*Primary Examiner*—Richard L. Ellis
*Assistant Examiner*—Gautam R. Patel
(74) *Attorney, Agent, or Firm*—Fish & Richardson P.C.

(57) ABSTRACT

A method and an apparatus for reducing the number of instruction transactions in a microprocessor are disclosed. As a method, the number of issued instructions carried by an issued instruction bus in a computer system are reduced by determining if an instruction fetched by a fetch unit matches a cached instruction tag. When the fetched instruction matches the cached instruction tag, an opcode and an associated instruction corresponding to the cached instruction tag are directly injected to an appropriate function unit. The apparatus includes a plurality of tag PC cache memory devices used to store tag PC entries associated with target instructions injected directly to corresponding function units included microprocessors and the like. The injection reduces the number of instructions fetched from the program memory as well as the number of issued instructions carried by an issued instruction bus.

14 Claims, 6 Drawing Sheets

| TAG PROGRAM COUNTER 402 | TARGET PROGRAM COUNTER 404 | VALID FIELD (V) 406 | LOOP SIZE FIELD (S) 408 | GROUP FIELD (G) 410 | PREDICT FIELD (P) 412 | TARGET INSTRUCTIONS 414 |
|---|---|---|---|---|---|---|

| TAG PROGRAM COUNTER 402 | TARGET PROGRAM COUNTER 404 | VALID FIELD (V) 406 | LOOP SIZE FIELD (S) 408 | DESTINATION |
|---|---|---|---|---|
| N | 10 | 1 | N + 1 | FUNCTIONAL UNIT 316 |

| INSTRUCTION ID | INSTRUCTION |
|---|---|
| 01 | LOOP 10 |

REDUCING INSTRUCTION TRANSACTIONS IN A MICROPROCESSOR

FIELD OF THE INVENTION

The present invention pertains to computing systems and the like. More specifically, the present invention relates to reducing the number of instruction transactions in a microprocessor.

BACKGROUND OF THE INVENTION

Superscalar microprocessors achieve high performance by executing multiple instructions per clock cycle and by choosing the shortest possible clock cycle consistent with the design. Conversely, superpipelined microprocessors include a large number of pipeline stages for executing an instruction which is typically carried out by a number of steps that, in turn, are subdivided into the most equal possible substeps. Therefore, in order to execute an instruction completely, all of the substeps must be executed sequentially. FIG. 1 illustrates a conventional executable instruction dataword 100. The instruction datawora 100 is typically formed of an opcode field 102, an operand specifier A and an associated operand specifier B. An execution result specifier field C is used to store the result of the executed instruction. The opcode field 102 defines the specific operation to be performed on the operands A and B. Typical operations include, for example, addition, multiplication, branching, looping, and shifting. The result of such an operation is stored in the execution result data word C that is then made available for subsequent executable instructions.

FIG. 2A illustrates a conventional computing system 200 arranged to perform desired calculations based upon a user supplied program. The typical program used by the computing system 200 is generally formed of an ordered list of executable instructions, referred to as code, each of which is associated with a particular program counter (PC). The computing system 200 includes a programming memory 202 configured to store the executable instructions that form the program at memory locations corresponding to the program counters. Typically, the programming memory 202 is connected to a central processing unit (CPU) 204 by way of a bi-directional programming bus 206. The program counters are, in turn, used to point to the location within the memory 202 at which the corresponding executable instruction is stored.

By way of example, a typical instruction 220 executed by the computer system 200 is shown in FIG. 2B. The line of code 220 includes a program counter (PC) that points to a location 10 in the programming memory 202 where the instruction (composed of the opcode ADD and the respective operand specifiers 20 and 30) to be executed is to be found. In this case, the CPU 204 will add the values stored in locations 20 and 30 and store the result in memory location 100 as indicated by the RESULT specifier field.

Referring again to FIG. 2A, conventional instruction processing generally includes decoding the instruction, executing the instruction, and storing the execution result in the memory location in the programming memory 202 or in a register of the register file identified by the instruction. More specifically, during what is referred to as a fetch stage, the instruction 220 is fetched by a fetching unit 208 from the memory 202 based upon the memory address indicated by the program counter. At this point the fetching unit 208 parses the instruction 220 into the opcode data field 102 and the operand specifiers A and B. The opcode data field 102 is then conveyed by way of an issued instruction bus 210 to a decoder 212. Meanwhile, the operands at A and B are read from the register file 214.

Once received, the decoder 212 uses the opcode data field 102 to select a function unit (FU) such as, for example, function unit 216, arranged to perform the function corresponding to the opcode included in the opcode data field 102. By way of example using the line of code above, the FU 216 is an arithmetic logic unit (ALU) arranged to perform an ADDing operation upon the respective operands A and B stored in the register file 214. At this point, the FU 216 is ready to execute the instruction. It should be noted that the FU 216 can, in fact, be any appropriate function unit capable of executing the function indicated by the instruction opcode. Such functions include, for example, ADDing, as with an arithmetic logic unit (ALU), shifter, multiplier, etc. Once executed, the FU 216 outputs the execution result to the destination specified in C to the register file 214 where it is stored until such time as the value C is passed to the memory.

Operations related to the accessing instructions within the programming memory 202 is a major factor limiting the overall performance of the computing system 200, and more particularly the performance of the CPU 204. Such situations occur, for example, with large memories having long data access times, or in cases where the memory 202 is remotely located from the CPU 204 incurring long transmission delays. In these cases, the performance of the CPU 204 measured in the number of instructions executed per second is limited by the ability to retrieve instructions from the programming memory 202.

Conventional approaches to increasing microprocessor performance (i.e., increasing the number of instructions executed per second) includes adding a cache memory 218 for storing instructions. Even though the cache memory 218 is shown to be internal to the memory 202, it should be noted that the cache memory 218 can also be an external cache memory located outside the main memory 202 in close proximity to the CPU 204. Typically, the cache memory 218 is accessed more quickly than the memory 202. Generally, the cache memory 218 stores instructions from the memory 202 in what is referred to as cache lines. A cache line is formed of a plurality of contiguous bytes which are typically aligned such that the first of the contiguous bytes resides at an address having a certain number of low order bits set to zero. The certain number of low order bits is sufficient to uniquely identify each byte in the cache line. The remaining bits of the address form a tag which is used to refer to the entire cache line.

Even though including larger cache memories may increase the performance of the CPU 204 by making instructions readily available, the larger caches have commensurably longer cache access times. Longer cache access times restricts system performance by limiting the number of instructions per second available for the CPU 204 to execute regardless of the inherent clock cycle time of the CPU 204. As used in this discussion, the term cache access time refers to the interval of time required from the presentation of an address to the cache until the corresponding bytes are available for use by the CPU 204. As an example, a set associative cache access time includes time for indexing the cache storage, time for comparing the tags to the access address in order to select a row, and time for conveying the selected data from the cache.

Increasing cache access time is particularly deleterious to instruction caches used with high frequency microprocessors. By increasing the cache access time, the bandwidth of the issued instruction bus 210 is substantially reduced, particularly when cache access time becomes longer then the clock cycle time of the CPU 204.

In view of the foregoing, it should be apparent that increasing instruction issue bus bandwidth without resorting to increasing cache memory size would be desirable.

SUMMARY OF THE INVENTION

An improved system used to improve the performance of a microprocessor is described. More specifically, the system is arranged to increase the number of instructions executed by a microprocessor by selectively storing instructions in a cache memory associated with a corresponding function unit in the microprocessor. In one embodiment of the invention, a method for reducing the number of issued instructions in a computer system is described. In one embodiment, if a fetched instruction program counter (PC) matches a cached instruction tag, then an opcode and the associated instruction are directly injected to the function unit identified by the opcode without fetching from memory. In this way, the issued instruction bus is bypassed which increases the effective bandwidth of the issued instruction bus.

In another embodiment, an apparatus for reducing the number of instructions carried by an issued instruction bus and a program bus in a computing system having a central processor unit (CPU) is disclosed. The CPU is connected to a program memory by way of the program bus and includes a fetching unit connected to the program bus for fetching instructions from the program memory as directed by the CPU. The CPU also contains a plurality of function units each capable of configurably performing a specified operation as directed by the CPU based upon an opcode included in an issued instruction. Each of the function units is connected to the fetching unit by way of the issued instruction bus and receives appropriate issued instructions based upon the opcode. The apparatus includes a plurality of tag program counter (PC) cache memory devices each being associated with one of the function units. Each of the plurality of tag PC cache memory devices stores a corresponding tag PC and a target PC. An injector unit couples each of the plurality of tag PC cache memory devices to each of their respective function units such that when a fetched instruction includes a PC that matches a tagged PC stored in the tag PC cache memory devices, the PC is changed to the target PC and the actual instruction rather than being fetched from the memory is injected into the function unit by the tagged cache associated with that function unit.

In another embodiment of the invention, a method for reducing the number of instructions carried by an issued instruction bus and a program bus in a computing system having a central processor unit (CPU) is disclosed. The CPU is connected to a program memory by way of the program bus and includes a fetching unit connected to the program bus. The CPU also includes a plurality of function units each of which is connected to the fetching unit by way of the issued instruction bus. The CPU also includes a plurality of tag program counter (PC) cache memory devices each being associated with one of the function units. The CPU further includes an injector unit coupling each of the plurality of tag PC cache memory devices to each of their respective function units such that each of the plurality of tag PC cache memory devices stores a corresponding tagged PC, a target PC, and an target instruction. The target instruction has an associated target opcode used to select the function unit associated with the respective tag PC cache memory device.

The method is performed by the following operations. First, an instruction is fetched from the program memory based upon a program counter (PC) associated with the instruction. If the instruction PC does match a tag PC, the instruction PC is updated to a target PC associated with the tagged PC entry in the tag PC cache memory. The target opcode and issuing the target instruction are then directly injected to the function unit corresponding to the target opcode. If it is determined that the instruction PC does not match any entry in the tag PC cache memory, the instruction PC is incremented by the corresponding issue group size and then, in either case, the instruction is executed.

In still another embodiment, a method for executing an instruction in a central processing unit (CPU), the CPU comprising a fetching unit, a plurality of functions units, an instruction bus coupled between the fetching unit and the plurality of function units, a plurality of caches each corresponding to one of the plurality of functions units, and an injector unit coupling each of the caches to its corresponding function unit, the method is described. The instruction is fetched from memory associated with the CPU and it is then determined whether the instruction corresponds to any entries in any of the caches. If the instruction corresponds to an entry in one of the caches, the instruction is injected directly into a corresponding one of the function units via the injection unit thereby bypassing the instruction bus. However, where the instruction does not correspond to an entry in one of the caches, the instruction is transmitted to an appropriate function unit via the instruction bus.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A, 4B and 4C illustrate an executable instruction data word in accordance with an embodiment of the invention.

DETAILED DESCRIPTION OF THE PREFERRED EMBODIMENTS

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

Figure 1:
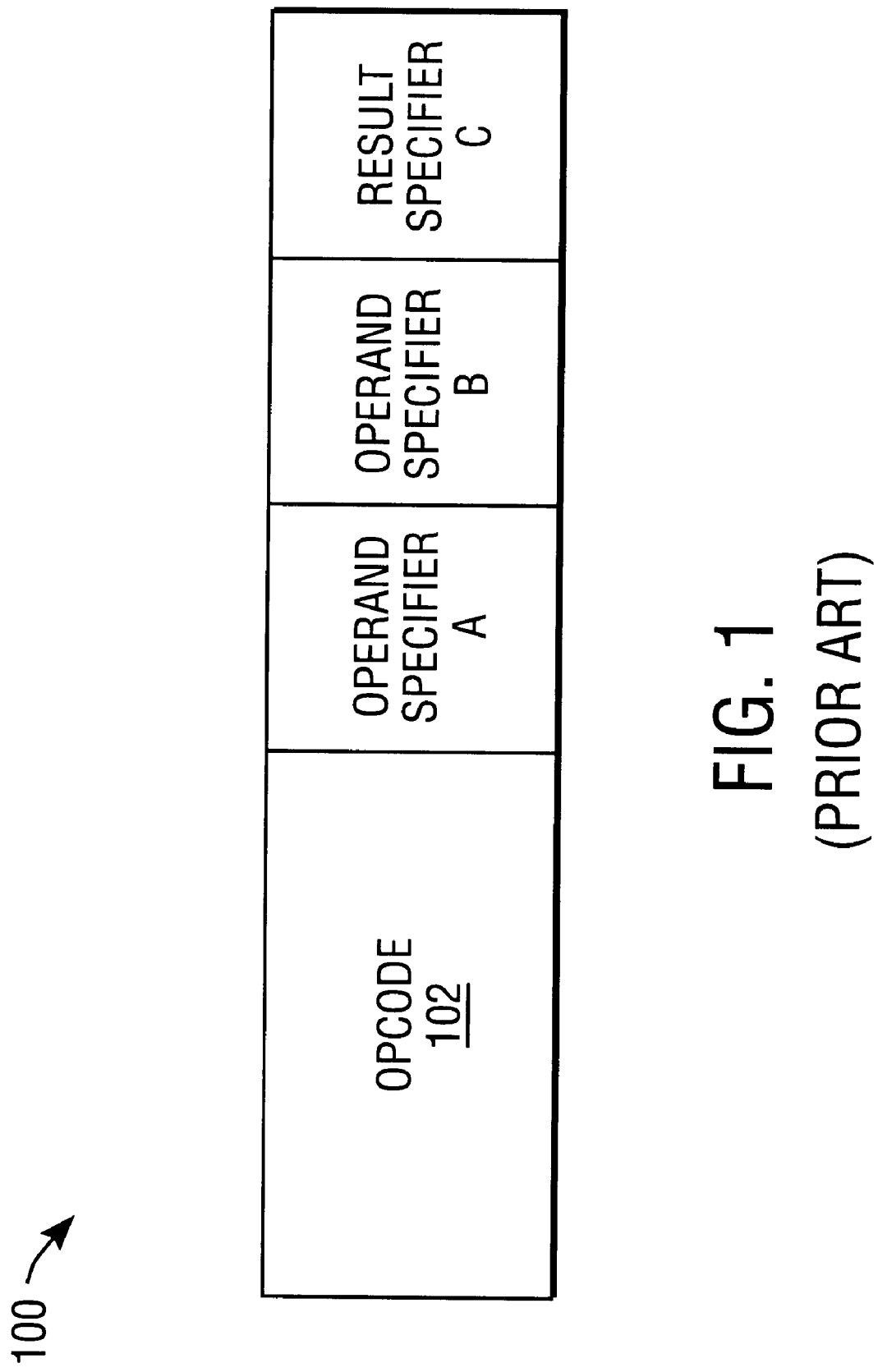
FIG. 1 illustrates a conventional executable instruction data word.
Figure 2A:
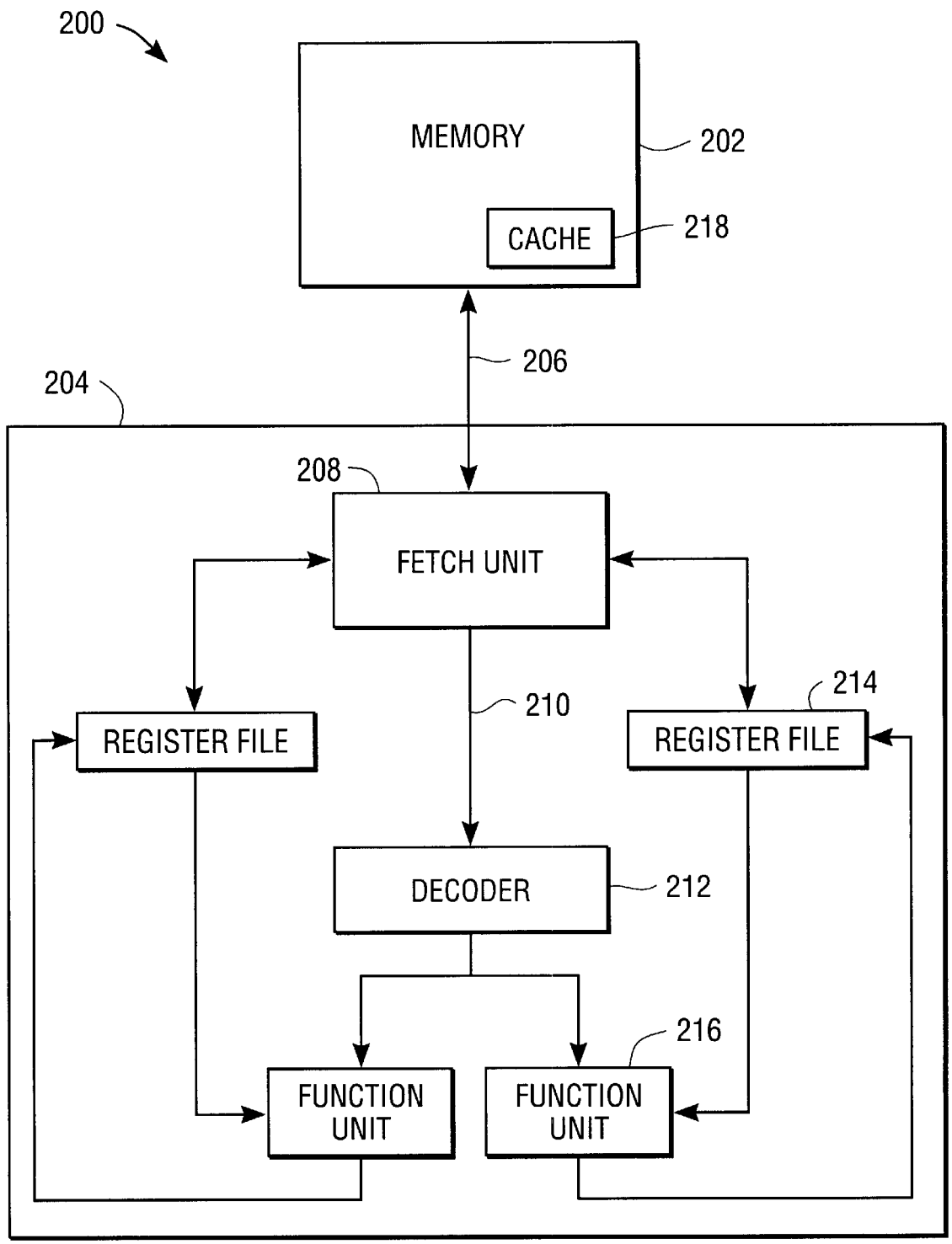
FIG. 2A illustrates a conventional computing system for which the executable instruction shown in FIG. 1 is used.
Figure 2B:
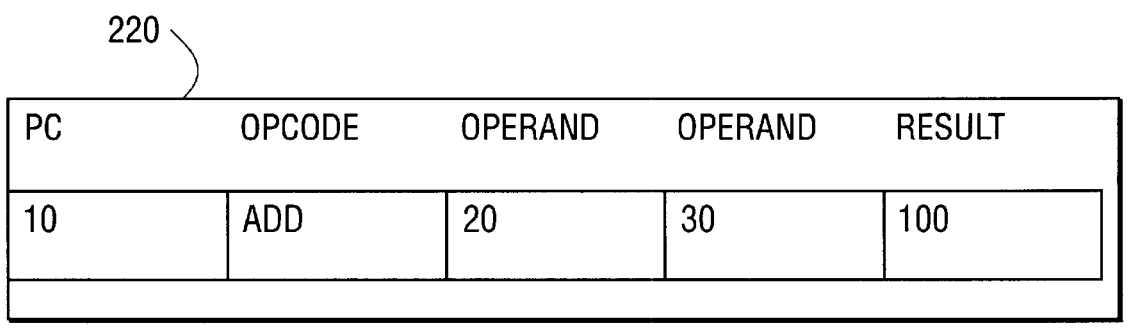
FIG. 2B illustrates a convention instruction executed on the computing system shown in FIG. 2A.
Figure 3:
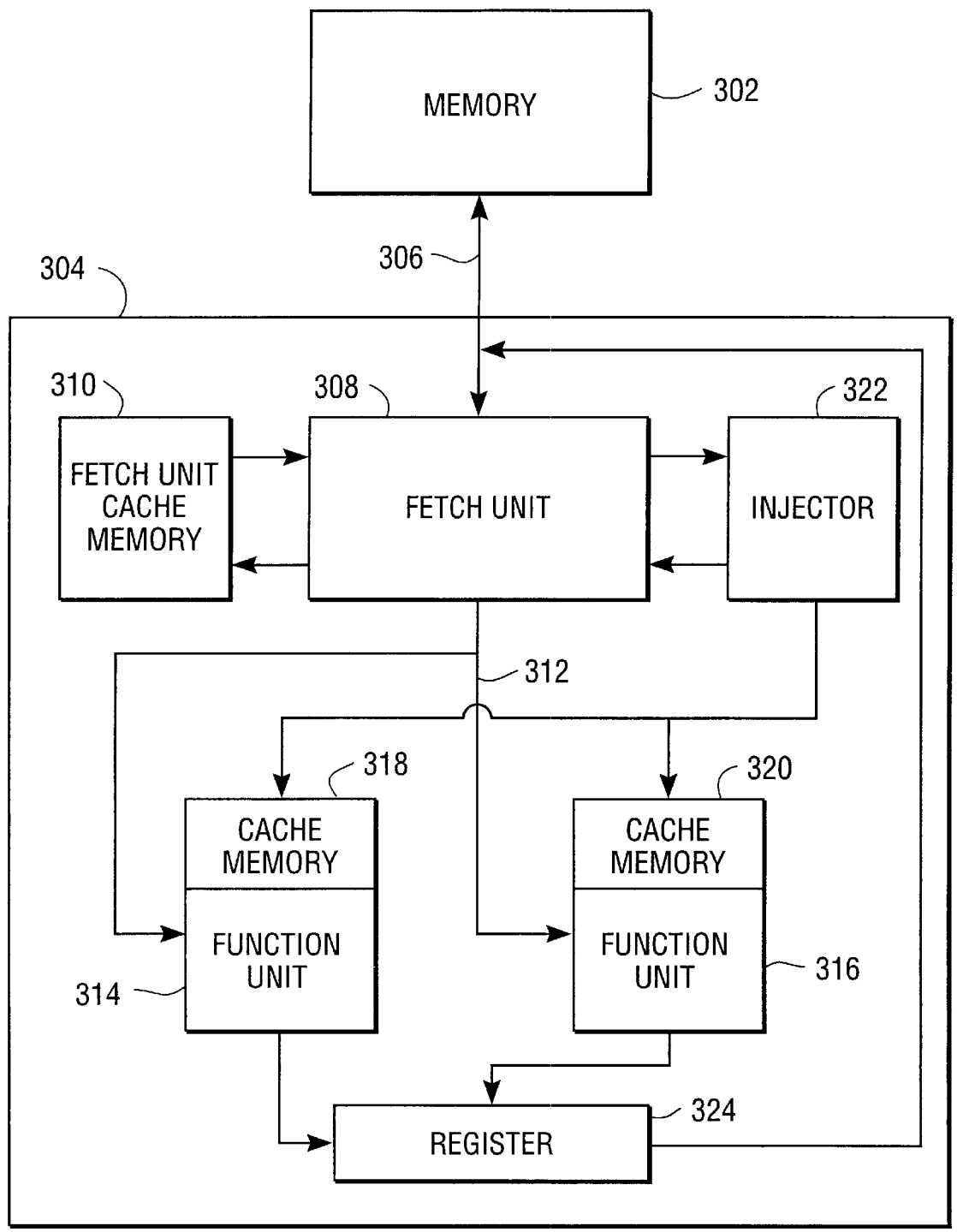
FIG. 3 illustrates a computing system in accordance with an embodiment of the invention.

Referring initially to FIG. 3, an illustration of a computing system 300 in accordance with an embodiment of the invention is shown. The computing system 300 includes a memory 302 connected to a CPU 304 by way of a memory bus 306. The CPU 304, in turn, includes a fetch unit 308 also connected to the programming bus 306. In the described embodiment, the CPU 304 includes a fetch unit cache memory 310 connected to the fetch unit 308. The fetch unit 308 is connected by way of an issued instruction bus 312 to a function unit 314 and a function unit 316. It should be noted that for sake of clarity, only two such function units are shown and, of course, any number and type of function unit can in fact be included in the CPU 304. As discussed above, the function units 314 and 316 can also be of any type, such as an ALU, multiplier, shifter, branch or loop units. In this way, a branching operation and an adding operation can be performed substantially in parallel as would be expected in, for example, a superscaler type multi-processor system and the like. In the described embodiment, each of the function units 314 and 316 has an associated function unit cache memory 318 and 320, respectively. An injector unit 322 is coupled with fetch unit 308 as well as with cache memory 318 of function unit 314 and cache memory 320 of function unit 316. In the described embodiment, a register file 324 is connected to the fetch unit 308 as well as the function units 316 and 318 and the memory 302. The register file 324 is arranged to store operands A and B associated with a fetched instruction. the register file 324 can also be divided into a plurality of separate register files as shown in FIG. 2A.

Referring now to FIG. 4A, a tag cache entry word 400 in accordance with an embodiment of the invention, is shown. It should be noted that the format of the tag cache entry 400 is but one of many possible configurations and as such should not be considered limiting. In the described embodiment, the tag cache entry 400 is typically stored in the fetch unit cache memory 310 but can also be stored in the function unit cache memories 218 and 220 as well as any other cache memory devices included in but not shown the computing system 300.

The tag cache entry 400 includes a variety of data fields each of which can be defined according to the application for which the instruction is applied. By way of example, a tag program counter (PC) data field 402 is used to point to the PC of an instruction or instruction type which the CPU 304 or user has determined to be significant. The tag cache entry 400 also includes a target program counter used to identify the memory location where the target instruction is stored. The tag cache entry 400 also includes a valid (V) data field 406 that is used to indicate that an instruction has been cached in the fetch unit cache memory 310. It should be noted that in those cases where a loop instruction has been cached, a loop size (S) data field 408 provides the size of the loop instruction (i.e., 16 or 32 bit instruction) in implementations where there are variable length instructions. In this way, the fallthrough PC (i.e.; the loop exit PC) can be calculated directly without any time penalty due to additional calculation time for the target PC. In superscalar type systems, a group data field (G) 410 provides the number of instructions issued as part of the issue group. A predictor (P) data field 412 is updated in a next to last cycle in a loop to provides a look ahead indicating that the next loop will exit to the loop. A target instruction field 414 is used, in some embodiments of the invention, to store the instruction corresponding to the target program counter 404. By storing the target instruction in the target instruction field 414, it is unnecessary to fetch the target instruction from the memory 302 since it is available locally in the tag cache entry 400.

In Table 1, a basic example of a representative program composed of a series of (n+1) executable instructions stored, for example in the programming memory 302 is shown. In this example, the program includes a typical loop instruction having a program counter represented as (N+1) that is used to execute the instructions from PC=10 to PC=n until such time as a loop exit condition is determined to be logically true. In one embodiment of the invention, the fetch unit 308 sequentially fetches each instruction of the representative program from the memory 302 starting with the instruction having a program counter PC=10. After each fetch, the fetching unit 308 issues the fetched instruction to the appropriate function unit by way of the issued instruction bus. The fetch unit 308 then fetches the instruction corresponding to the next program counter. In the described embodiment, the first time that the fetch unit 308 fetches the loop instruction at N+1, the fetch unit 308 stores a fetch unit cache entry 420 shown in FIG. 4B. The fetch unit 308 also issues the loop instruction to the appropriate function unit which for this example is the function unit 316. The function unit 316 receiving the issued instruction is notified that the instruction is being cached in the fetch unit cache memory 310 which responds by storing a corresponding functional unit cache entry 430 illustrated in FIG. 4C in its associated function unit cache memory 320.

TABLE 1

| PROGRAM COUNTER (PC) | INSTRUCTIONS |
| --- | --- |
| 10 | instruction 1 |
| 20 | instruction 2 |
| 30 | instruction 3 |
| . . . | . . . |
| . . . | . . . |
| N | instruction n |
| N + 1 | LOOP 10 |

Subsequently, whenever the program counter "N" is encountered by the fetch unit 308, instead of requesting the instruction corresponding to the program counter N+1, the fetch unit simply requests the instruction at program counter 10 represented by the target PC included in the fetch unit cache entry 420. The actual loop instruction associated with the program counter N+1 is injected by the injector unit 322 as directed by the fetch unit 308 directly to the function unit 316. In this way, the loop instruction corresponding to the program counter N+1 is only fetched from the memory 302 and issued to the appropriate function unit by way of the issued instruction bus the first time it is encountered by the fetch unit 308. Subsequent to the first encounter, the loop instruction is injected directly to the appropriate function unit thereby reducing the number of instruction transactions carried by the issued instruction bus. In this way, the effective transaction bandwidth of the issued instruction bus is commensurably increased.

Another example is shown in Table 2 illustrating a representative program having an exemplary branch instruction. The exemplary branch instruction passes control to a pre-determined program counter based upon whether or not a particular condition is true or false.

TABLE 2

| PROGRAM COUNTER (PC) | OPCODE |
| --- | --- |
| 05 | COUNT = 2 |
| 10 | ADD |

TABLE 2-continued

| PROGRAM COUNTER | OPCODE |
| --- | --- |
| 11 | MULTIPLY |
| 12 | SUBTRACT |
| 13 | BRANCH TO 10 UNTIL COUNT = 0; DECREMENT COUNT BY 1 |
| 14 | ADD |

The fact that every time PC=13 (except when COUNTER=0), the branch operation is executed, COUNT is decremented by 1 and control is passed to PC=10, provides a way for the CPU 304 to reduce the number of instruction transactions. For example, by setting the tag PC data field 404 to 12 (i.e.; the PC immediately prior to the branch instruction at PC=13) when instruction 12 is fetched there is a tag match and an injection is done to the branch execution unit. Therefore, control is immediately passed to PC=10 without returning to the programming memory 302 to fetch the branch instruction indicated by PC=13. In this way, the number of fetched instructions from the programming memory 302 is reduced. By reducing the number of fetched instructions, the bandwidth of the programming bus 306 is commensurably increased since, in this case, at least one "branch" instruction is not fetched from the programming memory 302 by the fetch/disburse unit 308. In addition, the same rationale can be applied to looping type instructions.

In operation when the CPU 304 executes the branch instruction at PC=13 it also updates a valid (V) data field 406 included in the tag cache entry 400. The V data field 406 indicates that the PC=13 (associated with the branch instruction) has been entered into a TAG PC cache 320 included in the fetch/disburse unit 308. It should be noted that in those cases where a loop instruction has been tagged, a loop size (S) data field 408 provides the size of the loop instruction (i.e., a 16 or a 32 bit instruction size) in implementations where there are variable length instructions. In this way, the fallthrough PC (i.e.; the loop exit PC) can be calculated directly without any time penalty. In superscalar type systems, a group data field (G) 410 provides the number of instructions issued as part of the issue group. In the case illustrated in TABLE 2, the issue group associated with the branching operation at PC=13 is an issue group of size 2 since it points to a branch operation as well as an SUBTRACTing type operation (i.e.; decrementing COUNTER). A predict (P) data field 412 is updated in a next to last cycle in a loop to provides a look ahead indicating that the next loop will exit to the loop exit PC and reset in the last iteration in case the loop is seen again.

Still referring to FIG. 4, the tag cache entry 400 also includes a data field used to further reduce the number of fetch operations required to implement the program illustrated in TABLE 2. For example, a target instruction data field 414 is used to store the instructions associated with the target PC stored in the target PC data field 404. In this way, using the example of TABLE 2, fetching the instruction stored in the memory location indicated by PC=10 (i.e.; ADD) is no longer required since control is immediately passed to PC=11. In addition, the target instruction is injected directly to the function unit indicated by the target instruction opcode by an injector unit 322. The injector unit 322 bypasses the issued instruction bus 310 thereby reducing the number of instruction transactions carried by the issued instruction bus 310 and commensurably increasing its bandwidth.

Figure 5:
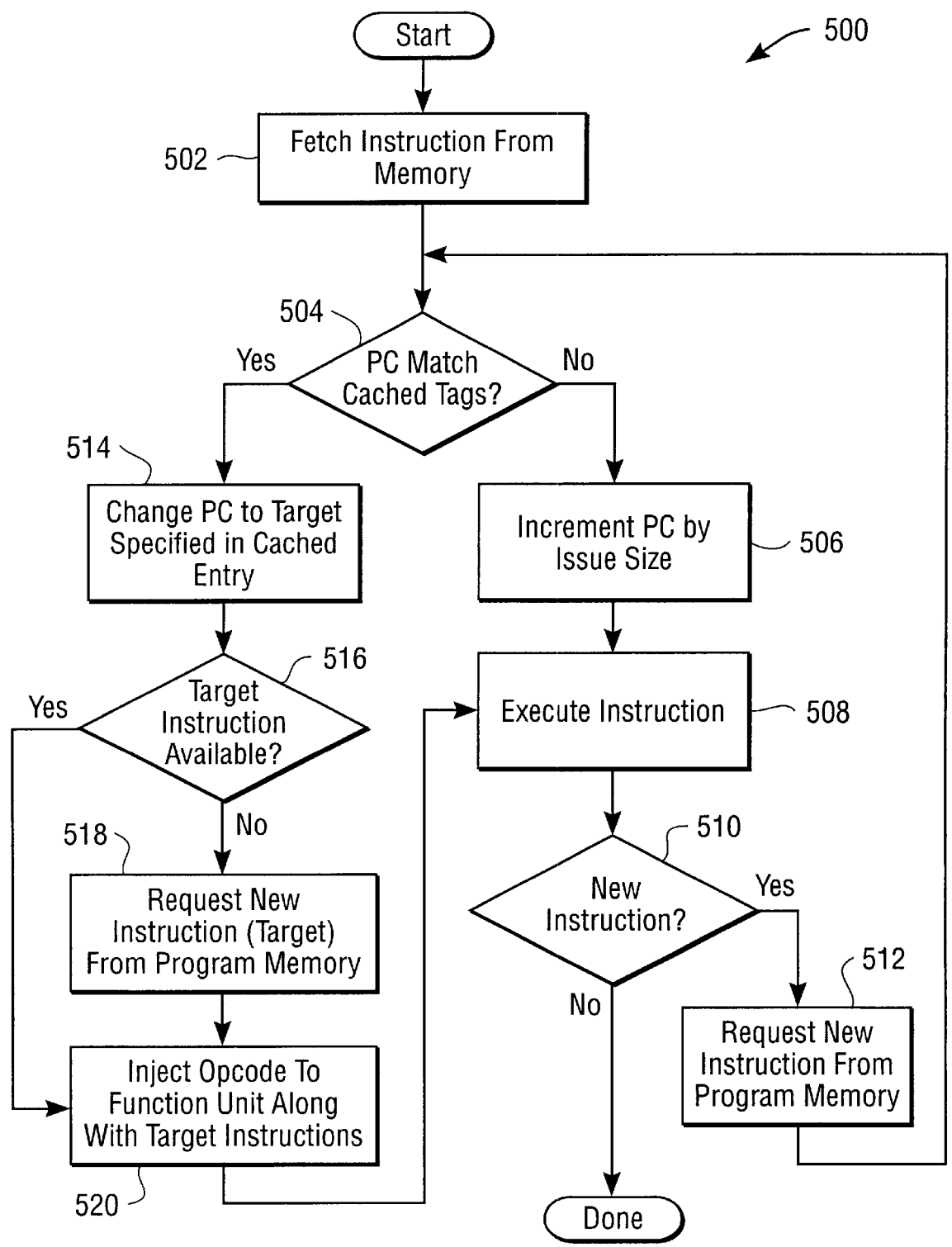
FIG. 5 is a flowchart detailing an apparatus for reducing the number of instruction transactions in accordance with an embodiment of the invention.

FIG. 5 is a flowchart detailing one possible method of executing an instruction in accordance with an embodiment of the invention. A first instruction is fetched (502) from the memory. Next, it is determined if the PC of the fetched instruction matches any entries in any tag PC caches (504). If it is determined that there are no tag PC matches in any of the tag PC caches, the PC of the fetched instruction is incremented by the size of the issue group (506) and the instruction is then executed according to the opcode included therein (508). Next, if a new instruction is to be executed (510), then a new instruction request is forwarded to the program memory for fetching (512).

If, however, it had been determined that the tag PC of the fetched instruction did match an entry in any of the tag PC caches (504), then the PC of the fetched instruction is updated to the matching target PC specified in the cache memory (514). If no target instruction is stored in the fetched instruction (516), then the target instruction is fetched from the program memory (518), however, if the target instruction is stored in the fetched instruction, then no request for the target instruction is made of the programming memory. In either case, the target opcode along with the target instructions are injected to the target function unit (520). Once injected, the target instruction is executed (508) and if after execution no new instructions are to be executed, then processing stops, otherwise a new instruction is requested from the program memory (512).

The described arrangements have numerous advantages. One such advantage is the invention reduces the number of bus transactions over the programming bus as well as the issued instruction bus. In this way, the bandwidth of the programming bus and the issued instruction busses are commensurably increased without resorting to adding or increasing cache memory. By increasing the respective bandwidths, the performance of the processor is increased without substantial added costs or redesigns. Other advantages include the fact that by reducing the need for additional cache memory, the cost of the computing system is commensurably decreased. The described invention works well with any computing system, including but not limited to those including microprocessors and the like.

Although only a few embodiments of the present invention have been described in detail, it should be understood that the present invention can be embodied in many other specific forms without departing from the spirit or scope of the invention. Particularly, although the invention has been described primarily in the context of integrated circuits having processor subsystems, the advantages including increased bus bandwidths are equally applicable to any device capable of generating large amounts of information related to, for example, multi-processor computing systems.

Additionally, the characteristics of the invention can be varied in accordance with the needs of a particular system. Therefore, the present examples are to be considered as illustrative and not restrictive, and the invention is not to be limited to the details given herein, but may be modified within the scope of the appended claims.

What is claimed is:

1. A method of reducing the number of issued instructions in a computer system having a fetch unit arranged to fetch instructions stored in a memory, the fetch unit being coupled to a function unit by way of an issued instruction bus, comprising:

caching a first instruction including an opcode in a cache memory that is directly connected to the function unit and is not coupled to the issued instruction bus;

caching an instruction tag from the first instruction;

determining if a second instruction fetched by the fetch unit matches the cached instruction tag; and injecting the opcode and the associated instruction corresponding to the cached instruction tag from the cache memory directly to the function unit when the fetched second instruction matches the cached instruction tag, such that the issued instruction bus is bypassed thereby increasing the effective bandwidth of the issued instruction bus.

2. A method as recited in claim 1, wherein the fetched instruction includes a program counter used to identify a memory location at which the fetched instruction is stored.

3. A method as recited in claim 2, further comprising:

incrementing the program counter when the fetched instruction does not match the cached instruction tag; and executing the fetched instruction.

4. A method as recited in claim 2, further comprising:

changing the program counter of the fetched instruction to a target program counter specified by the cached instruction tag; and determining if a target instruction is available.

5. A method as recited in claim 4, further comprising:

requesting a target instruction from the memory when no target instruction is available.

6. A method as recited in claim 3, further comprising:

determining if a new instruction is to be fetched by the fetch unit;

fetching the new instruction from memory when it is determined that a new instruction is to be fetched.

7. An apparatus for reducing the number of instructions carried by an issued instruction bus and a program bus in a computing system having a central processor unit (CPU) connected to a program memory by way of the program bus, the CPU includes a fetching unit connected to the program bus arranged to fetch instructions from the program memory as directed by the CPU, the CPU also contains a plurality of function units each capable of configurably performing a specified operation as directed by the CPU based upon an opcode included in an issued instruction, each of the function units is connected to the fetching unit by way of the issued instruction bus and receives appropriate issued instructions based upon the opcode, comprising;

a plurality of tag program counter (PC) cache memory devices, each tag PC cache memory device associated with one of the function units, wherein each of the plurality of tag PC cache memory devices stores a corresponding tag PC that points to a target PC that is used to select an associated function unit;

an injector unit coupling each of the plurality of tag PC cache memory devices to each of their respective function units, the injector unit including a plurality of cache memories, each cache memory directly connected to an associated function unit and not coupled to the issued instruction bus, the injector unit receiving a first fetched instruction corresponding to a target instruction with a target opcode from the fetch unit and caching the target instruction in one of the cache memories that is connected to an appropriate associated function unit; and wherein when a second fetched instruction includes a PC that matches a tagged PC stored in the tag PC cache memory devices, the injector unit bypasses the issued instruction bus by using the target opcode included in the target instruction to inject the target instruction from one of the plurality of cache memories directly to the appropriate associated function unit.

8. An apparatus as recited in claim 7, wherein the fetched instruction includes, a tag PC data field used in comparison with tag PC entries stored in the tag PC cache memories; and a target PC data field used to point to the corresponding target instruction stored in the program memory.

9. An apparatus for reducing the number of instructions carried by an issued instruction bus and a program bus in a computing system having a central processor unit (CPU) connected to a program memory by way of the program bus, the CPU includes a fetching unit connected to the program bus arranged to fetch instructions from the program memory as directed by the CPU, the CPU also contains a plurality of function units each capable of configurably performing a specified operation as directed by the CPU based upon an opcode included in an issued instruction, each of the function units is connected to the fetching unit by way of the issued instruction bus and receives appropriate issued instructions based upon the opcode, comprising:

a plurality of tag program counter (PC) cache memory devices, each tag PC cache memory device associated with one of the function units, wherein each of the plurality of tag PC cache memory devices stores a corresponding tag PC that points to a target PC that is used to select an associated function unit;

an injector unit coupling each of the plurality of tag PC cache memory devices to each of their respective function units, the injector unit including a plurality of cache memories, each cache memory directly connected to an associated function unit and not coupled to the issued instruction bus, the injector unit receiving a target instruction having a target opcode from the fetch unit and caching the target instruction in one of the cache memories that is connected to an appropriate associated function unit; and wherein when a fetched instruction includes a PC that matches a tagged PC stored in the tag PC cache memory devices, the injector unit bypasses the issued instruction bus by using the target opcode included in the target instruction to inject the target instruction directly to the appropriate function unit;

wherein the fetched instruction includes a tag PC data field used in comparison with tag PC entries stored in the tag PC cache memories;

a target PC data field used to point to the corresponding target instruction stored in the program memory;

a verify field used to indicate that a matching tag PC entry is stored in the tag PC cache memories;

a size data field used to indicate the number of loops in a looping operation; and a group data field used to indicate the number of issued instructions in an issue group associated with the target PC.

10. An apparatus as recited in claim 9, wherein when the fetched instruction does not include a target instruction data field, the target instruction is fetched from the program memory.

11. An apparatus as recited in claim 10, wherein the function units are reconfigurable function units.

12. A multi-processor computer system, comprising:

a program memory used to store program instructions;

a program bus;

a microprocessor connected to the program memory by way of the program bus, the microprocessor including, a fetching unit arranged to fetch program instructions from the program memory by way of the program bus, the fetching unit is also arranged to issue instructions as directed by the microprocessor, a plurality of function units connected to the fetching unit arranged to selectively perform operations based upon opcodes included in the issued instructions, and an issued instruction bus connecting the fetching unit to the plurality of function units arranged to carry the issued instructions; and an apparatus for reducing the number of instruction transactions including a plurality of tag program counter (PC) cache memory devices, each tag PC cache memory device associated with one of the function units, wherein each of the plurality of tag PC cache memory devices stores a corresponding tag PC that points to a target PC that is used to select an associated function unit, an injector unit coupling each of the plurality of tag PC cache memory devices to each of their respective function units, the injector unit including a plurality of cache memories, each cache memory directly connected to an associated function unit and not coupled to the issued instruction bus, the injector unit receiving a first fetched instruction corresponding to a target instruction having a target opcode from the fetch unit and caching the target instruction in one of the cache memories that is connected to an appropriate associated function unit, and wherein when a second fetched instruction includes a PC that matches a tagged PC stored in the tag PC cache memory devices, the injector unit bypasses the issued instruction bus by using the target opcode included in the target instruction to inject the target instruction from one of the plurality of cache memories directly to the appropriate associated function unit.

13. A multi-processor computer system as recited in claim 12 further including a plurality of microprocessors.

14. A method for executing an instruction in a central processing unit (CPU), the CPU comprising a fetching unit, a plurality of functions units, an instruction bus coupled between the fetching unit and the plurality of function units, a plurality of caches each corresponding to one of the plurality of functions units, and an injector unit coupling each of the caches to its corresponding function unit, the method comprising:

fetching a first instruction from a memory associated with the CPU;

caching the first instruction with a target opcode in one of the plurality of caches, the cache directly connected to the function unit and not coupled to the instruction bus;

caching an instruction tag from the first instruction;

fetching a second instruction from memory associated with the CPU;

determining whether the second instruction corresponds to any entries in any of the caches;

where the second instruction corresponds to an entry in one of the caches, using the target opcode to inject the first instruction from the one of the plurality of caches directly into a corresponding one of the function units via the injection unit and bypass the instruction bus;

where the second instruction does not correspond to an entry of one of the caches, transmitting the second instruction to an appropriate function unit via the instruction bus; and executing the instruction that has been received by the functional unit.

* * * * *